Nov. 10, 1959            O. DAHLE            2,912,642
METHOD AND DEVICE FOR INDICATING AND MEASURING MECHANICAL
STRESSES WITHIN FERRO-MAGNETIC MATERIAL
Filed April 5, 1954
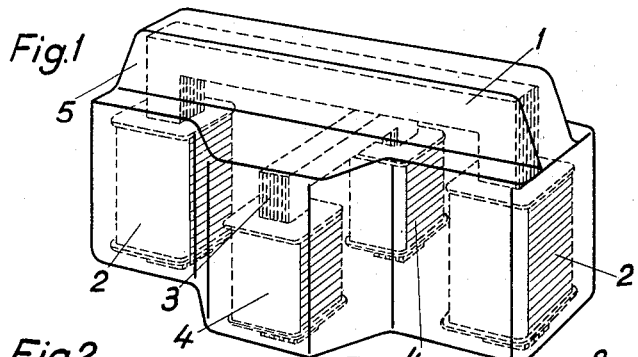
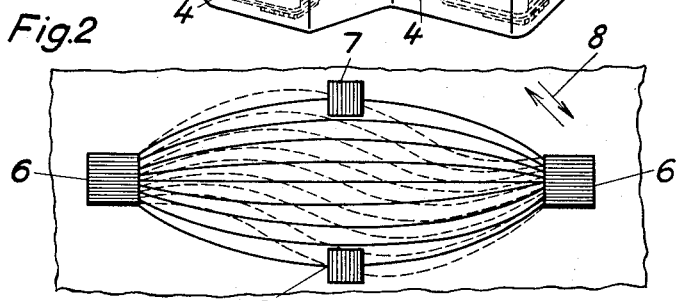
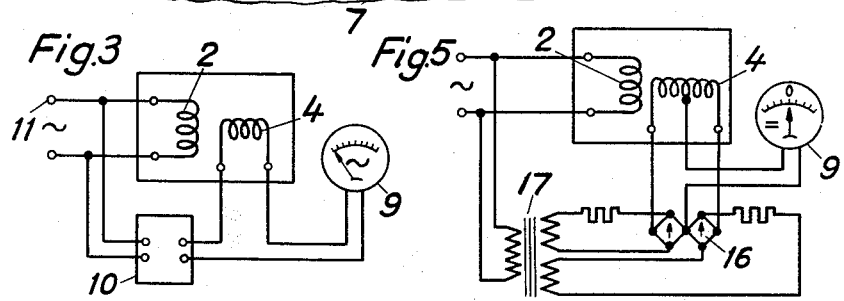
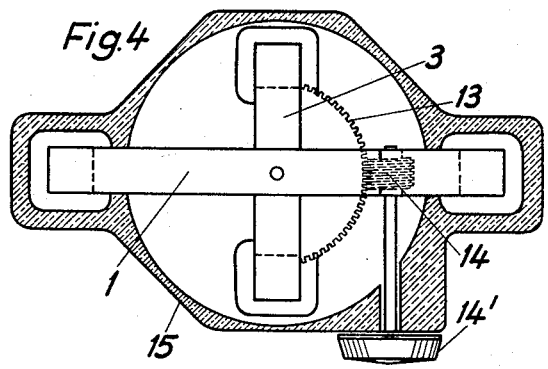
Inventor
Orvar Dahle
By Eames Aiken
           Attorney.

United States Patent Office 2,912,642
Patented Nov. 10, 1959

2,912,642

METHOD AND DEVICE FOR INDICATING AND MEASURING MECHANICAL STRESSES WITHIN FERRO-MAGNETIC MATERIAL

Orvar Dahle, Vasteras, Sweden, assignor to Allmänna Svenska Elektriska Aktiebolaget, Vasteras, Sweden, a corporation of Sweden Application April 5, 1954, Serial No. 421,074

Claims priority, application Sweden April 18, 1953

4 Claims. (Cl. 324—34)

This invention relates to a method and device for measuring mechanical stresses in a member of magnetostrictive material.

It is a known phenomenon that if a body of magnetic material is subjected to mechanical stress its magnetic properties are altered so that the permeability is changed. These variations are especially large in certain magnetic alloys, e.g. in Permalloy, wherein the permeability for tensile loading may attain a value, which is much greater than the permeability of the unloaded material. In nickel and certain nickel alloys, however, the permeability increases when the material is subjected to compressive stresses. This variation of the permeability has been exploited in the construction of certain instruments for measuring mechanical forces. These instruments have usually comprised an inductance bridge, which has furnished an alternating voltage corresponding to the variation in the permeability.

This method for measuring mechanical stresses, however, involves certain drawbacks, one of which is that special materials have to be used in the bodies, on which the measurement takes place, for obtaining appreciable measuring voltage and for avoiding too sensitive measuring instruments. In the measurement it is, therefore, necessary to insert such a measuring body of special material in the path of the lines of mechanical force, which, as a rule, means a considerable rearrangement within the machine or mechanical construction on which the measurement shall take place.

The present invention relates to a method by means of which the mechanical stress may be measured on any body of magnetic material which is subjected to a mechanical force. The invention also relates to a simple device for performing these measurements.

The principal feature of the invention is that at least two magnetic circuits are arranged so that the material forms at least part of these circuits, at least one of which contains a magnetomotive force which produces a flux within the material in such a way that of the axes of symmetry of those parts of the magnetic circuits formed in the material itself at least one axis has a direction differing from that of the mechanical stress, and that at least one of the magnetic circuits is surrounded by a coil connected to an indicating or measuring instrument.

The invention is based on the fact that a magnetic field, acting on a body of magnetic material, is subjected to a variation in magnitude or direction if the body is subjected to a mechanical stress. According to the invention, an alternating magnetic field is produced in the body by a two- or multi-pole electromagnet, the poles of which are in contact with the body or are arranged at a small distance from it. In the simplest case the field is produced by a two-pole electromagnet, and the measurement is carried out by a two-pole magnet means arranged at right angles to the former. If the body of the magnetic material is magnetically isotropic, the poles of the magnet means will be located at two magnetically equipotential points on the body in question. If now, due to a tension, torsion or compression, a mechanical stress arises within the body, the direction of which makes an angle with the magnetic field, the magnetic flux produced by the electromagnet will change its direction, which means that the points, at which the poles of the magnet means are located, will have unequal magnetic potentials, whereby the magnet means is traversed by an alternating flux which produces a voltage in a winding surrounding it. This voltage forms a measure of the mechanical stress, whether due to tension, torsion or compression. In order to calibrate the device, a test-measurement at a known stress is necessary.

In those cases where the body to be measured is magnetically anisotropic in its unstressed state, this anisotropy first has to be compensated for in the measuring device, which may be done, for instance, by turning the magnet means with respect to the electromagnet, so that the measuring magnet means has its poles positioned at equipotential points on the body when the latter is not subjected to stresses. This compensation may also be performed by an auxiliary voltage inserted into the measuring circuit.

According to a variant of the invention, the magnetic field may be produced in the body by means of a permanent magnet or a direct-current electromagnet, and the variation of the magnetic anisotropy may be indicated or measured by providing a magnetic circuit comprising a measuring coil substantially at right angles to the said permanent field.

The invention has, as mentioned above, the advantage that the measuring device may be located near or in direct contact with that particular point of a construction where the mcehanical stresses are to be investigated, and that the measuring device may also be used for the study of the stress within a moving member of a machine, e.g. a rotating shaft, in which case the measuring device may be fixed either on the member in question or arranged in the immediate vicinity of the member, provided that the member is shaped and moves in such a way that an unchanged air gap is maintained between the member and the measuring device.

The invention may be employed for measuring stresses in stationary parts of machines, e.g. roller-stands, screw-downs in rolling mills or beams or struts of bridges and other constructions, but it may also be used for measuring the torque within shafts or clutches. Likewise, the invention can be employed for weighing a load suspended from a crane or for weighing railway-wagons or other vehicles.

The invention will now be described, reference being made to the accompanying drawing, wherein Fig. 1 is a perspective view of a measuring device according to the invention, and Fig. 2 shows the pattern of the lines of magnetic flux produced by the device shown in Fig. 1 in the surface layer of a member, both for the case where the material is not subjected to any stress as well as when it is subjected to a stress in the direction indicated by arrows. Fig. 3 shows diagrammatically a wiring diagram for the device of Fig. 1. Fig. 4 shows a modification of the device shown in Fig. 1, wherein the magnets are movable with respect to each other, and Fig. 5 shows a modification of the wiring diagram of Fig. 3, wherein the measuring coil is connected to the measuring instrument via a phase-sensitive rectifier.

In Fig. 1, a soft iron core designated by 1 is surrounded by two coils 2 adapted to be connected to an alternating current source. 3 indicates a soft iron core arranged at right angles to core 1 and provided with two coils 4 adapted to be connected to a measuring instrument. The two cores 1 and 3 together with their coils 2 and 4 are moulded into a material 5, suitably a synthetic resin, whereby the magnets are fixed in proper position with respect to each other.

Fig. 2 shows schematically a part of the surface of a member near to which the measuring device according to Fig. 1 is placed. 6 designates the two pole faces of core 1, and 7 the two pole faces of core 3. The full lines represent the lines of magnetic flux in the case where the member is not subjected to any mechanical stress, and the broken lines represent the lines of magnetic flux in the case where the member is subjected to a stress in the direction of the arrows 8.

Fig. 3 shows the wiring diagram of the device shown in Fig. 1 wherein 2 is the winding which produces the magnetic flux in the surface layer of the member, and 4 is the winding of core 3 which is used for measuring the variation in the flux. 9 is a measuring instrument, and 10 is an arrangement connected in series with the instrument for producing from the alternating current source 11, an auxiliary voltage, adjustable in amplitude and phase.

Fig. 4 shows a section through a modification of the device illustrated in Fig. 1 which differs in that the two cores 1 and 3 are movable with respect to each other. According to Fig. 4 the magnet core 3 is provided with a toothed wheel 13, with which a worm 14 engages, which may be rotated by a knob $14^1$. This arrangement is used in cases where even the unstressed member is anisotropic, or where asymmetry occurs for some other reason. A compensating body, having the form of a screw, inserted within the casing 15 and not shown on the drawing, may also be used as an alternative for moving the core 3.

Fig. 5 shows an arrangement which permits indication of reversal of the direction of the mechanical stress and which increases the precision of the measuring device and at the same time reduces the influence of harmonics in the voltage and eliminates disturbances arising from rotational voltages when measuring on rotating bodies. The arrangement comprises a phase sensitive rectifier 16, which consists of two Graetz-connected rectifier bridges, to which the measuring winding 4 and the measuring instrument 9 are connected. These rectifier bridges are controlled by voltages taken from a transformer 17, which voltages are applied to the direct current terminals of the bridges, while the measuring winding 4 and the measuring instrument 9 are connected to the alternating current terminals of the bridges.

This arrangement functions in such a way that the voltages taken from the two secondaries of the transformer 17 alternately block the two bridges so that the alternating voltage generated within the winding 4 gives rise to a direct current through the instrument 9, the direction of which current is depending on the phase angle between the alternating voltage across the winding 2 and the alternating voltage generated within the measuring winding 4.

I claim as my invention:

1. A device for measuring mechanical stress in a member of ferromagnetic material, comprising two substantially U-shaped magnetic cores each having two pole-faces, means for fixing said cores in a substantially bisymmetric relationship and with said pole-faces of both of said cores at the same end of the arrangement so that said pole-faces may be readily located close to a surface of said member, two coils are surrounding each of said magnetic cores, means for connecting one of said coils to a source of alternating current, and a voltage responsive means connected to the second of said two coils, whereby an alternating voltage dependent on the mechanical stress is impressed on said voltage responsive means when said pole-faces are located close to said surface during a measurement.

2. A method of measuring mechanical stress in a member of magnetostrictive material having a surface accessible for measurement, which comprises the steps of generating a non-uniform magnetic field of predetermined pattern in a part of said surface, causing said pattern to change due to the magnetostrictive properties of said member by applying a mechanical force to said member producing a substantially uniform mechanical stress in said part of said surface, measuring the difference between the magnetic potentials in two spaced points in said surface located within said part of said surface in such a way that they are substantially magnetically equipotential when said member is not subjected to any mechanical force, to thereby ascertain the magnitude of said stress.

3. A method as claimed in claim 2, in which said magnetic field is an alternating field.

4. A method as claimed in claim 2, including the steps of providing a restricted magnetic path entirely outside said member and ending close above said points, and measuring the magnetic flux flowing in said magnetic path.

References Cited in the file of this patent

UNITED STATES PATENTS

| | | |
|---|---|---|
| 1,971,549 | Woodward | Aug. 28, 1934 |
| 2,228,294 | Wurzbach | Jan. 14, 1941 |
| 2,255,053 | Gunn | Sept. 9, 1941 |
| 2,370,845 | Davis | Mar. 6, 1945 |
| 2,437,455 | Berman | Mar. 9, 1948 |
| 2,511,178 | Roters | June 13, 1950 |
| 2,511,233 | Anderson | June 13, 1950 |
| 2,553,833 | Rifenbergh | May 22, 1951 |